United States Patent [19]
Dronen

[11] Patent Number: 4,628,246
[45] Date of Patent: Dec. 9, 1986

[54] METHOD FOR PHASIC SEQUENTIAL COUPLING OF THREE-PHASE SHORT-CIRCUIT GENERATORS

[76] Inventor: Olav Dronen, 3520 Farum, Denmark

[21] Appl. No.: 456,055
[22] PCT Filed: Apr. 29, 1982
[86] PCT No.: PCT/DK82/00037
  § 371 Date: Dec. 27, 1983
  § 102(e) Date: Dec. 27, 1983
[87] PCT Pub. No.: WO82/03952
  PCT Pub. Date: Nov. 11, 1982

[30] Foreign Application Priority Data
Apr. 29, 1981 [DK] Denmark .............. 1893/81

[51] Int. Cl.$^4$ .............................................. H02J 3/08
[52] U.S. Cl. ...................................... 322/100; 307/87
[58] Field of Search ............... 322/7, 8, 35, 90, 94-98, 322/100; 307/43, 47, 84, 87, 85

[56] References Cited
U.S. PATENT DOCUMENTS

| | | | |
|---|---|---|---|
| 3,069,556 | 12/1962 | Apfelbeck et al. | 322/100 X |
| 3,493,778 | 2/1970 | Cutler et al. | 307/87 |
| 3,794,846 | 2/1974 | Schlicher et al. | 307/87 |
| 4,256,972 | 3/1981 | Wyatt et al. | 307/87 X |
| 4,322,630 | 3/1982 | Mezera et al. | 307/87 X |

FOREIGN PATENT DOCUMENTS 1119401 12/1961 Fed. Rep. of Germany .
1161846 9/1958 France .

Primary Examiner—R. J. Hickey
Attorney, Agent, or Firm—Antonelli, Terry & Wands

[57] ABSTRACT

Coupling of the asynchronous machine to the AC mains is effected in the way that the contacts arranged for the purpose are closed when the voltage across them before coupling is at a maximum. Coupling can be done by several stages, from two and upwards. The coupling device, which primarily aims at coupling of windmill generators, has the effect that because of the precise coupling relative to the maxima of the voltages, the DC link in the current will be negligible, with the result that the transient torques will become insignificant. In this way, it is avoided that coupling will cause the rotary system of the windmill to oscillate. The lack of DC will also result in small voltage drops in the mains. If the windmill has no transformer of its own, the current surges can be dampened further by effecting coupling over impedances which are cut out stepwise at voltage maxima over these.

4 Claims, 10 Drawing Figures

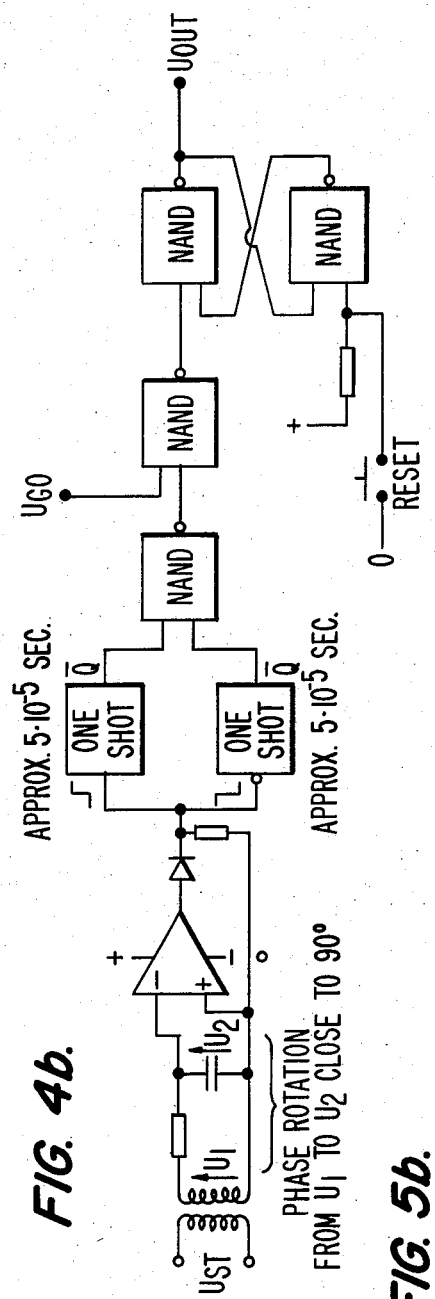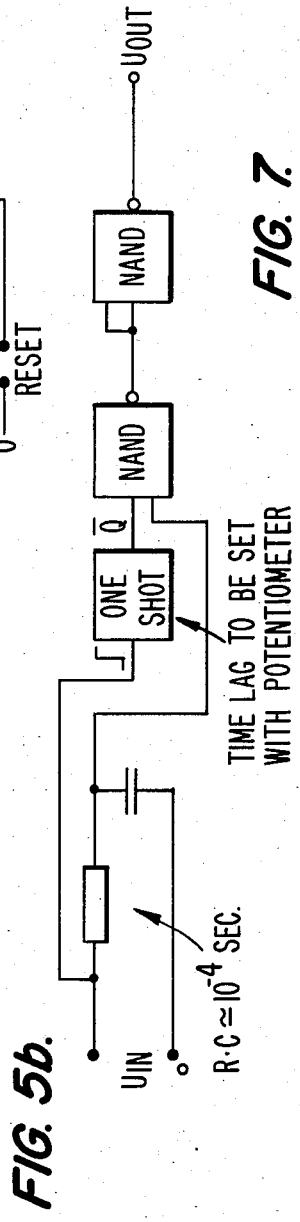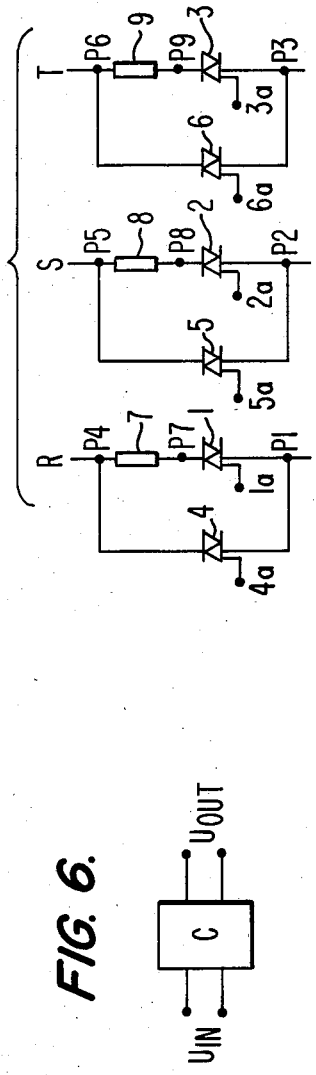

LOGICAL "1" WHEN COUPLING IS REQUIRED

METHOD FOR PHASIC SEQUENTIAL COUPLING OF THREE-PHASE SHORT-CIRCUIT GENERATORS

The object of the invention is to soft couple AC mains, preferably, of asynchronous windmill generators.

The general coupling method used today is a direct or one stage coupling of the generators to the AC mains by three-phase contactors at a speed equal or close to the generator's synchronous speed. Such coupling will set up a direct current in at least two of the phases, with the direct current sitting up a static magnetomotive force in the generator's air gap. At the same time, currents will be induced in the rotor, even if the generator runs synchronously. The field which is set up by the rotor currents will, together with the static field, create strong torque pulsations which can make the entire rotary system hunt violently, with a harmful effect on shafts, gear unit, and mill arms. The coupling method also results in heavy voltage drops in the mains which may disturb local consumers.

The invention is characterized in that the sequential coupling of the single phases, especially the first power-producing coupling and short-circuit of any series impedances, is made around the respective voltage maxima of the contacts used for the purpose before coupling.

Such phase voltage control has not been established in the known designs of sequential couplings.

Compared to the known technology, the result is a considerable reduction in both coupling surges and torque changes since the direct current transients can be kept at a reasonable minimum during coupling at times of phasic voltage maxima.

FIG. 4b shows the diagrammatic construction of the phase rotation module (A);

FIG. 5b shows the diagrammatic construction of a time lag module (B);

FIG. 6 shows an activation module (C) for semiconductor contactors;

FIG. 7 shows a contact arrangement made with series impedances and based on semiconductor contactors;

Figure 1:
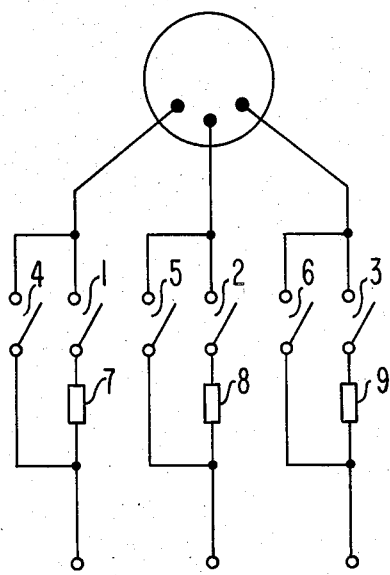
FIG. 1 shows a coupling made with external shortable series impedances, which coupling applies to both star and delta-wound stators.

Referring now to the drawings wherein like reference numerals are used through the various views to designate like parts and, in a three-phase generator such as shown in FIG. 1, the windings (not shown) can be either star or delta-coupled, with two contact connections 1 and 4, 2 and 5, and 3 and 6, respectively emanating from each of the three generator terminals; 1, 2, and 3 of these contacts being connected to the AC mains via impedances of a purely ohmic or ohmic/inductive nature 7, 8, and 9, while contacts 4, 5, and 6 are connected direct to the AC mains.

Figure 2:
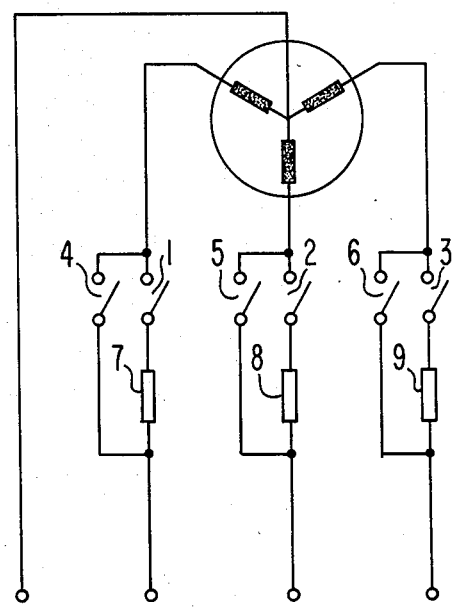
FIG. 2 is a coupling member corresponding to FIG. 1, with a star-wound stator and a separate neutral point brought out.

FIG. 2 shows the same contact and series impedance arrangement as used in FIG. 1, but the generator, which is shown in star coupling, has a neutral point brought out.

Figure 3:
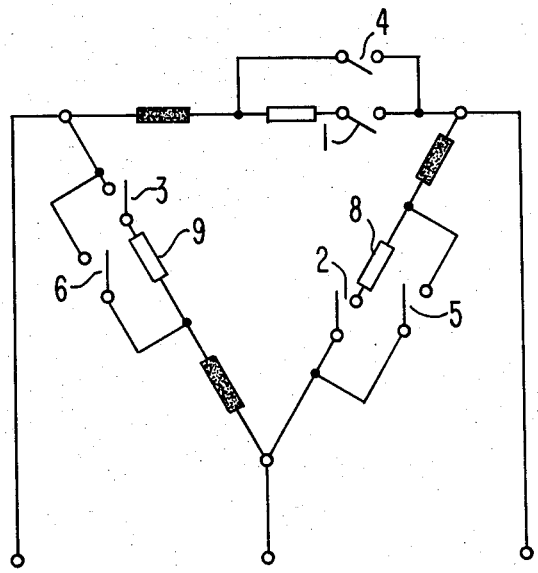
FIG. 3 shows a delta-coupled generator with shortable series impedances internally in the delta coupling.

FIG. 3 shows generator windings with internal contact and series impedance arrangements which on the surface are in the form of delta coupling.

When soft coupling is aimed at, contacts 1, 2, and 3 coupled to the series impedances are closed sequentially, whereafter contacts 4, 5, and 6 placed over series impedances 7, 8, and 9 are closed sequentially so that direct coupling to the AC mains is established.

Figure 4A:
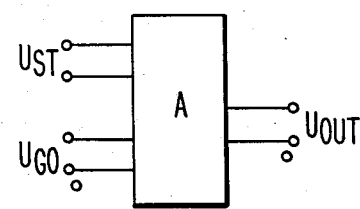
FIG. 4a shows a phase rotation module (A) for phase control of semiconductor contactors.

In FIG. 4a the module receives, via $U_{st}$ terminals, the phase AC voltage from one of the contacts 1-6 as long as it is open and emits a phase-controlled closing signal as logic signal "1" across terminal $U_{out}$ when a logic signal "1" is received across terminals $U_{go}$.

In FIG. 4b, the phase input $U_{st}$ is fed via an isolating transformer across an R.C. phase rotation link to an operator amplifier whose square voltage output is supplied via a diode to two one-shot generators, one of which is triggered on a rise in signal voltage, while the other is triggered on a fall in signal voltage. At a phase rotation of approx. 90° C. in the R.C. link, one one-shot generator will be activated at the positive maximum of the phase voltage, while the other will be triggered at the negative maximum. The $\overline{Q}$ outputs of both one-shot generators are supplied to a two-input nand gate which will emit a positive output impulse for each $\overline{Q}$-pulse which means that a positive pulse is emitted in both the positive and negative maxima of the phase voltages. These phase marking pulses are carried forward as one input to the next two-input nand gate, whose other input $U_{go}$ at a change to logical "1" will activate it at the first coincidence with a phase marking pulse.

Figure 5A:
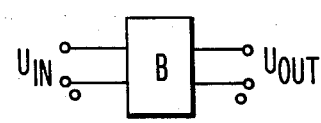
FIG. 5a shows a time lag module (B)

As shown in FIG. 5a, as a time lag link across terminals $U_{in}$ the module receives a control voltage in the form of logic signal "1" and emits, with an adjustable time lag, an output voltage in the form of a logic signal "1" across the output terminal $U_{out}$.

In FIG. 5b, at a transition to logic signal "1" at $U_{in}$, a one-shot generator is triggered whose $\overline{Q}$ goes to a logical signal "0" over a selectable interval of time. At the same time an R.C. link is activated from $U_{in}$ and emits a delayed logic signal "1" which together with the above-mentioned $\overline{Q}$ signal arrives at a following nand gate after the $\overline{Q}$ signal has gone to the logic signal "0". At the end of the one-shot generator's impulse period, both input signals to the nand gate will be "1," whereafter the output signal goes to "0" which is inverted via the following nand gate. Therefore, $U_{out}$ will go to "1" with a time-lag relative to $U_{in}$ which corresponds to the one-shot generator's adjustable pulse period.

FIG. 6 shows a known building module for activation of a triac. A logic signal "1" across terminals $U_{in}$ results in (galvanically separated herefrom) a corresponding output activation voltage for the gate circuit in a triac.

FIG. 7 shows contacts 1-6 replaced by triacs with gate inputs 1a-6a.

Figure 8:
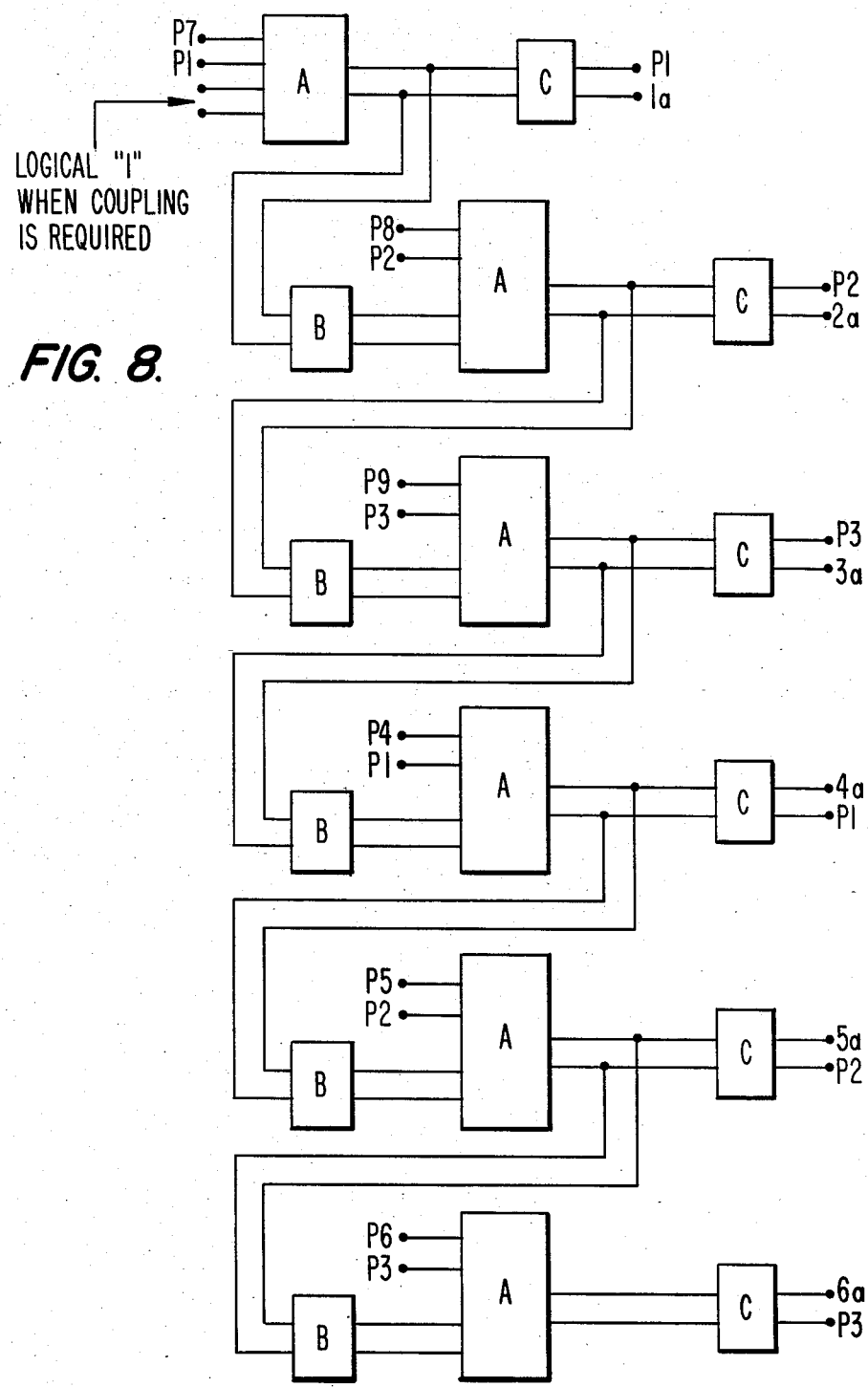
FIG. 8 shows a simplified diagram of the entire arrangement.

In FIG. 8, a "1" on phase-controlled blocks A triggers a triac activation via the association module block C at the first phase amplitude peak. After activation of the uppermost A-block the next phase-controlled A-block is activated via an inserted time lag block B and at the same time controls its C-module and transmits a control signal to the next set of A, B, and C-modules and so on until the last A, B, and C-modules have been activated. The number of the A-terminals and the number of C-terminals correspond to the connecting points shown in FIG. 7.

The coupling time of a single phase is uncritical for the coupling shown in FIG. 1 since, thanks to the other open contacts, a closed circuit has not yet been established. So it will be possible in this case to do without the uppermost A-module and feed the coupling command direct to the uppermost module C and direct to the following module A, whereafter the first power-supplying coupling is established at the subsequent phasic voltage maxima over a coupling contact, at the same time as the following module B is activated. The time lag in this module may be of the order of 100 msec before the following A-module is activated and phasically controls the coupling of the last phase, this coupling being less critical when the above-mentioned pause is of a reasonable duration, e.g. 40–100 msec. As regards generator coupling without series impedances, such as may be imagined with small units, coupling has then been finally established, but when it is a matter of large generators, it will, as shown in the diagrams, be necessary first to establish a connection via series impedances (7), 8, and 9, whereafter a sequential short-circuit of these is proceeded with via contacts 4, 5, and 6 where the time lags in the 3-elements may be of the same size as before and where the phasic coupling time is selected by the following A-modules close to the peak voltage time of the AC voltage sequence over the respective series impedances.

With regard to the couplings shown in FIGS. 2 and 3 the block diagram shown in FIG. 8 must be observed completely when series impedances are used, whereas, the last three module sets can be excluded if the series impedances are excluded.

To make the method cheaper, it will be possible to exclude two impedances and a coupling contact e.g. in the coupling, FIG. 1. The first power-supplying coupling is then made via the impedance. There will then be a pause of approx. 400 msec. before the impedance is shorted and approximately 100 msec thereafter before the third phase is coupled, in which time the induced voltage in this phase will become almost as large as and in phase with the main voltage. Hence coupling at voltage maximum is unnecessary.

I claim:

1. A method for phasic sequential coupling of a three-phase short-circuit generator to a power line, whereby coupling means in all three or at least two phase are actuated in a successive manner, characterized in detecting the instantenous voltage across the unactuated coupling means of at least the first power-supplying phase and actuating the respective coupling means in response to said detection at such a moment of time where said voltage shows a relative maximum amplitude.

2. A method according to claim 1, where, subsequent to the action of the coupling means, additional coupling means are actuated for shorting an impedance as mounted in the respective phase, the additional coupling means being actuated in response to detection of the voltage across the impedance showing a relative maximum amplitude.

3. A system for phasic sequential coupling of a three-phase short-circuit generator to a power line, the system comprising coupling means for individual coupling of the phases and control means for actuating the coupling means, wherein the control means comprises means for detecting a maximum amplitude of an AC voltage across the unactuated coupling means of a potential power-supplying phase and actuating the coupling means at such a moment of time at which the voltage amplitude is at or near a relative maximum.

4. A system according to claim 3, in which the coupling means and at least one of the phases comprises an impedance mounted in the phase and a switch bridging said impedance so as to be operable to short the impedance, said switch being operatively connected with said control means so as to be instantneously closeable in response to the control means detecting a relative maximum of the amplitude of the voltage across the impedance.

* * * * *